No. 674,093.   
D. B. MORISON.  
PILE FOR FORGINGS.  
(Application filed Sept. 14, 1899.)  
Patented May 14, 1901.

(No Model.)

Witnesses:  
C. A. Duffy.  
C. Sedgwick.

Inventor:  
Donald B. Morison  
By Osgood & Co.  
his Attys.

UNITED STATES PATENT OFFICE.

DONALD BARNS MORISON, OF HARTLEPOOL, ENGLAND.

PILE FOR FORGINGS.

SPECIFICATION forming part of Letters Patent No. 674,093, dated May 14, 1901.

Application filed September 14, 1899. Serial No. 730,516. (No model.)

*To all whom it may concern:*

Be it known that I, DONALD BARNS MORISON, a subject of the Queen of Great Britain and Ireland, residing at Hartlepool, in the county of Durham, England, have invented Improvements in Piles for Forgings, of which the following is a specification.

My invention has reference to an improved manufacture of forgings, having for its object to make them of more uniform and reliable structure throughout.

In the manufacture from iron of a forged shaft—such, for example, as a steamship propeller-shaft, which is subjected to very severe stresses—the forging is produced from strips or bars of iron built up into a pile, which is heated and subsequently welded so as to form part of the forging, and notwithstanding that it is advantageous that the fiber of the iron should be parallel to the axis of the forging produced it is usual in building the pile to place the bars of each layer at right angles to the bars in the adjoining layers in order to give stability to the pile, the bars of which are found to spread or move apart during manipulation and welding if arranged parallel with each other. Now in the manufacture of forgings according to my invention the pile is built of bars of such sections and in such a manner that the fiber of the iron is maintained in one direction and that nevertheless such stability is given to the pile that the bars will be so retained or locked in position the pile can be manipulated for heating and welded without the bars tending to spread or become displaced, the arrangement, moreover, being such when more than one piece is used in each layer that the joints between the several pieces in each layer will not be in the same vertical planes as those of the adjoining layers, but will be displaced relatively to one another. The improved technical effect of this is that the forging produced by the heating and welding of such a pile will not only be comparatively free from lamination and have the joints between the bars forming each of its layers effectively welded, but the fibers of the iron will be approximately parallel throughout the forging, which will therefore be better able to withstand compound stresses such as obtain in propeller-shafts and the like.

Figure 1:
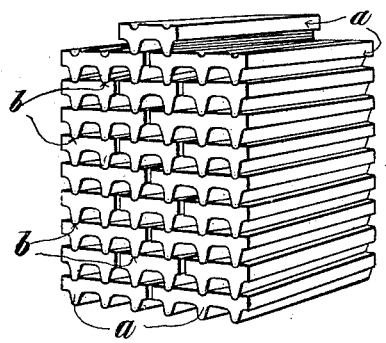
Figure 2:
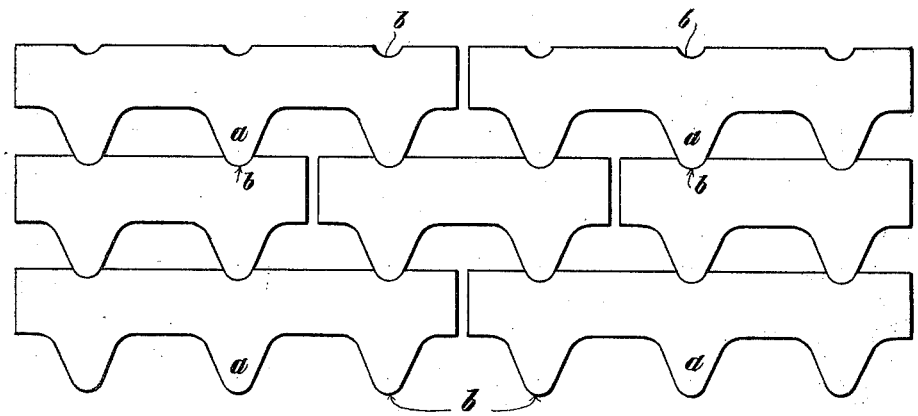

In the accompanying drawings, Figure 1 illustrates in perspective a pile ready to be heated and welded for the manufacture of a forging according to this invention. Fig. 2 is an end elevation, to an enlarged scale, of three layers of the pile shown in Fig. 1.

Referring to the drawings, the pile is built up of pieces of iron rolled to an approximately rectangular section, with integral triangular ridges or projections $a$ on one side and grooves or recesses $b$ on the other side, extending longitudinally of the pieces and adapted for the reception of portions of the ridges or projections $a$ of the pieces of the adjacent layer, as shown clearly in Fig. 2. The pieces in each layer are of a different width to the pieces in the adjoining layers, so that the joints in one layer are not in the same vertical planes as the joints in the adjoining layers. The pieces also of themselves form regular channels for the free circulation of the heating-gases, thus insuring a uniform distribution of heat throughout the pile. For example, the pile may, as illustrated, consist of a lower layer comprising two pieces of rectangular section, each integrally formed on one side with three longitudinally-projecting ridges $a$ and on its other side with grooves suitable for the reception of portions of similar ridges $a$ of the superposed layer, which comprises three narrower pieces with two ridges $a$, these narrower pieces being of such width that when arranged side by side with suitable spaces between them they will form a layer equal in breadth to the adjoining layers. The stability of the structure is insured by reason of each piece readily assuming the correct position with the desired spaces between the pieces in each layer and with the projections $a$ resting in the grooves $b$, notwithstanding careless building up of the pile. When the pieces are being welded under a hammer, the ridges $a$ will penetrate or embed themselves in portions of the pieces of the next layer in such a manner as not only to hold or lock the pieces together and prevent them spreading by becoming separated from each other, but to also cause lateral displacement of the iron of the layer in which they become embedded, whereby the longitudinal joints between the pieces forming each layer are forcibly closed and effectively welded.

The formation of lamination in forgings produced from such piles will be minimized, owing to the metal of one layer becoming embedded in the next, and thus preventing continuous horizontal joints or welds, while the arrangement of the pieces prevents continuous vertical joints or welds throughout the forging.

As will be seen, the apices of the projections or ridges $a$ will come in contact with the grooved portions of the pieces of the next layer, separating the layers by the amount of the depth of the projections or ridges less the depth of the grooves. The projections or ridges $a$, which are, as compared with loose pieces, immovable during the heating and welding, thus form regular and uniform channels between the layers for the free circulation of the gases and insure a practically or approximately uniform distribution of heat throughout the pile.

As will be understood, the number and form of the integral ridges or projections and of the grooves or recesses may be varied, and the piles may be built up so that the projections or ridges extend upwardly instead of downwardly, if desired.

What I claim is—

1. A pile for forgings comprising layers of parallel bars of iron of rectangular cross-section with longitudinal integral ridges which of themselves form channels between the layers, the bars of each layer being of a similar section but of a different width to those of the adjacent layers as set forth.

2. A pile for forgings comprising layers of parallel bars of iron of rectangular cross-section with longitudinal integral ridges on one side and with corresponding grooves on the other so as to form channels between the layers, the bars of each layer being of a similar section but of a different width to those of the adjacent layers as set forth.

3. A pile for forgings comprising bars of iron, the fibers of which extend longitudinally, arranged parallel or approximately parallel to each other in layers, the bars of iron in each layer being of a similar cross-section, but breaking joint with those of adjacent layers, said bars having on one of their sides integral longitudinal ridges which of themselves form channels between the layers, and on the other side longitudinal grooves adapted to receive the ridges of the next layer, as set forth.

Signed at West Hartlepool, in the county of Durham, England, this 31st day of August, 1899.

DONALD BARNS MORISON.

Witnesses:
T. HARRY TILLY,
J. B. STROVER.